(12) United States Patent
Fukuda

(10) Patent No.: US 7,281,596 B2
(45) Date of Patent: Oct. 16, 2007

(54) DRIVE BELT COOLING STRUCTURE FOR ENGINE

(75) Inventor: Kazutaka Fukuda, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 183 days.

(21) Appl. No.: 10/701,213

(22) Filed: Nov. 4, 2003

(65) Prior Publication Data

US 2004/0094343 A1 May 20, 2004

(30) Foreign Application Priority Data

Nov. 5, 2002 (JP) ............................. 2002-320728

(51) Int. Cl.
*B60K 11/06* (2006.01)
(52) U.S. Cl. ...................... 180/68.2; 180/376; 474/144
(58) Field of Classification Search ............... 280/68.2, 280/339, 366, 377, 376; 474/144; 180/68.2, 180/339, 366, 377, 376
See application file for complete search history.

(56) References Cited

U.S. PATENT DOCUMENTS

| 4,697,665 A | * | 10/1987 | Eastman et al. ............ 180/230 |
| 4,712,629 A | * | 12/1987 | Takahashi et al. ......... 180/68.1 |
| 6,155,371 A | | 12/2000 | Izumi |
| 6,170,597 B1 | | 1/2001 | Fukuda |
| 6,182,784 B1 | * | 2/2001 | Pestotnik ..................... 180/376 |
| 6,267,700 B1 | * | 7/2001 | Takayama ..................... 474/93 |
| 6,398,683 B1 | | 6/2002 | Fukuda |
| 6,454,040 B1 | | 9/2002 | Fukuda |
| 6,571,904 B2 | | 6/2003 | Izumi |
| 2001/0029215 A1 | * | 10/2001 | Ohyama et al. ............ 474/148 |

FOREIGN PATENT DOCUMENTS

| JP | 11-11170 | | 1/1999 |
| JP | 11011170 A | * | 1/1999 |
| JP | 2000018348 A | * | 1/2000 |

* cited by examiner

*Primary Examiner*—Christopher P. Ellis
*Assistant Examiner*—John D Walters
(74) *Attorney, Agent, or Firm*—Knobbe Martens Olson & Bear LLP

(57) ABSTRACT

A drive belt cooling structure for an offroad vehicle including an internal combustion engine. The engine has at least one cylinder, a piston positioned in the cylinder, and a crankshaft. The transmission includes a transmission chamber defined by a transmission case. A primary shaft of the transmission is driven by the crankshaft. A main shaft of the transmission is offset from the primary shaft and is driven by the primary shaft through a drive belt. The main shaft is arranged to drive at least one of the wheels. The primary shaft is supported by a support bracket, the support bracket being connected to the crankcase. An air inlet is adapted to permit entry of cooling air into the transmission chamber, and an air guide is configured to direct a flow of cooling air into the transmission chamber along the drive belt, the air guide being connected to the support bracket.

28 Claims, 10 Drawing Sheets

US 7,281,596 B2

DRIVE BELT COOLING STRUCTURE FOR ENGINE

RELATED APPLICATIONS

This application is related to, and claims priority from, Japanese Patent Application No. JP2002-320728, filed Nov. 5, 2002, the entirety of which is expressly incorporated by reference herein.

BACKGROUND OF THE INVENTION

1. Field of the Invention

The present invention relates to an all-terrain vehicle. More particularly, the invention is a driving belt cooling structure for engines.

2. Description of the Related Art

Offroad vehicles or "ATVs" as they are commonly referred to are designed to be operated over rugged terrain. These vehicles are often operated on steep inclines and declines, on rough roads, and in mud and water.

These vehicles include a frame supported by wheels. In one common arrangement, the vehicle has four wheels. An internal combustion engine is used to power at least one, and most commonly all, of the wheels.

In this arrangement, a first drive shaft extends to a front axle and a second drive shaft extends to a rear axle. Each of these drive shafts extends generally parallel to a centerline of the vehicle extending in the front and rear directions.

The first and second drive shafts are driven by a crankshaft of the engine. The vehicle includes a transmission through which the first and second drive shafts are powered by the crankshaft.

It is desirable for the engine and related drive train of the vehicle to have a compact arrangement. To facilitate this goal, the engine is often arranged so that the crankshaft extends transverse to the longitudinal centerline of the vehicle. In this arrangement, the center of gravity of the engine is near the centerline of the vehicle, and the periphery of the engine does not extend far from this centerline.

On the other hand, this arrangement has the drawback that the rotation of the crankshaft must be transmitted to the first and second drive shafts which are arranged transverse to the crankshaft. This requires a transmission. To keep the transmission compact, one or more of the various shafts thereof may be supported in cantilevered fashion, which may reduce the useful life of the shafts. Additionally, in a variable speed transmission, heat due to friction within the transmission may reduce the useful life of various components of the transmission, such as the drive belt, for example.

SUMMARY OF THE INVENTION

One aspect of the present invention involves an all terrain vehicle including an internal combustion engine supported by a frame. The engine has at least one cylinder, a piston positioned in the cylinder, and a crankshaft of the engine. The crankshaft is arranged to drive at least one of the wheels through the transmission, the vehicle having a front end and a rear end and a longitudinal direction extending from the front end to the rear end. The transmission includes a belt chamber defined by a belt case, a primary shaft at least partially positioned in the belt chamber and driven by the crankshaft, and a main shaft at least partially positioned in the belt chamber and offset from the primary shaft. The main shaft is driven by the primary shaft by a belt positioned in the belt chamber. The main shaft is arranged to drive at least one of the wheels. The primary shaft is supported by a support bracket, the support bracket being connected to the crankcase. An air inlet is adapted to permit entry of cooling air into the belt chamber, and an air guide is configured to direct a flow of cooling air into the belt chamber along the belt, the air guide being connected to the support bracket.

Another aspect of the present invention involves an all terrain vehicle including a frame and an engine compartment defined within the frame. An engine is mounted within the engine compartment and includes a crankcase, a transversely extending crankshaft, and a transmission connected to the crankshaft. The transmission is disposed within a transmission chamber, the transmission having a drive pulley, a driven pulley, and a drive belt connecting the drive pulley and the driven pulley. A transmission primary shaft is connected to the drive pulley. A first end of the primary shaft is supported by the crankshaft and a second end of the primary shaft is supported by a support bracket. The support bracket is connected to the crankcase and an air inlet is adapted to permit entry of cooling air into the transmission chamber. The support bracket includes a means for guiding a flow of cooling air along at least a portion of the drive belt.

BRIEF DESCRIPTION OF THE DRAWINGS

These and other features, aspects, and advantages of the present invention are described with reference to drawings of a preferred embodiment, which are intended to illustrate, and not to limit, the present invention. The drawings include 11 figures.

DETAILED DESCRIPTION OF THE PREFERRED EMBODIMENT

Figure 1:
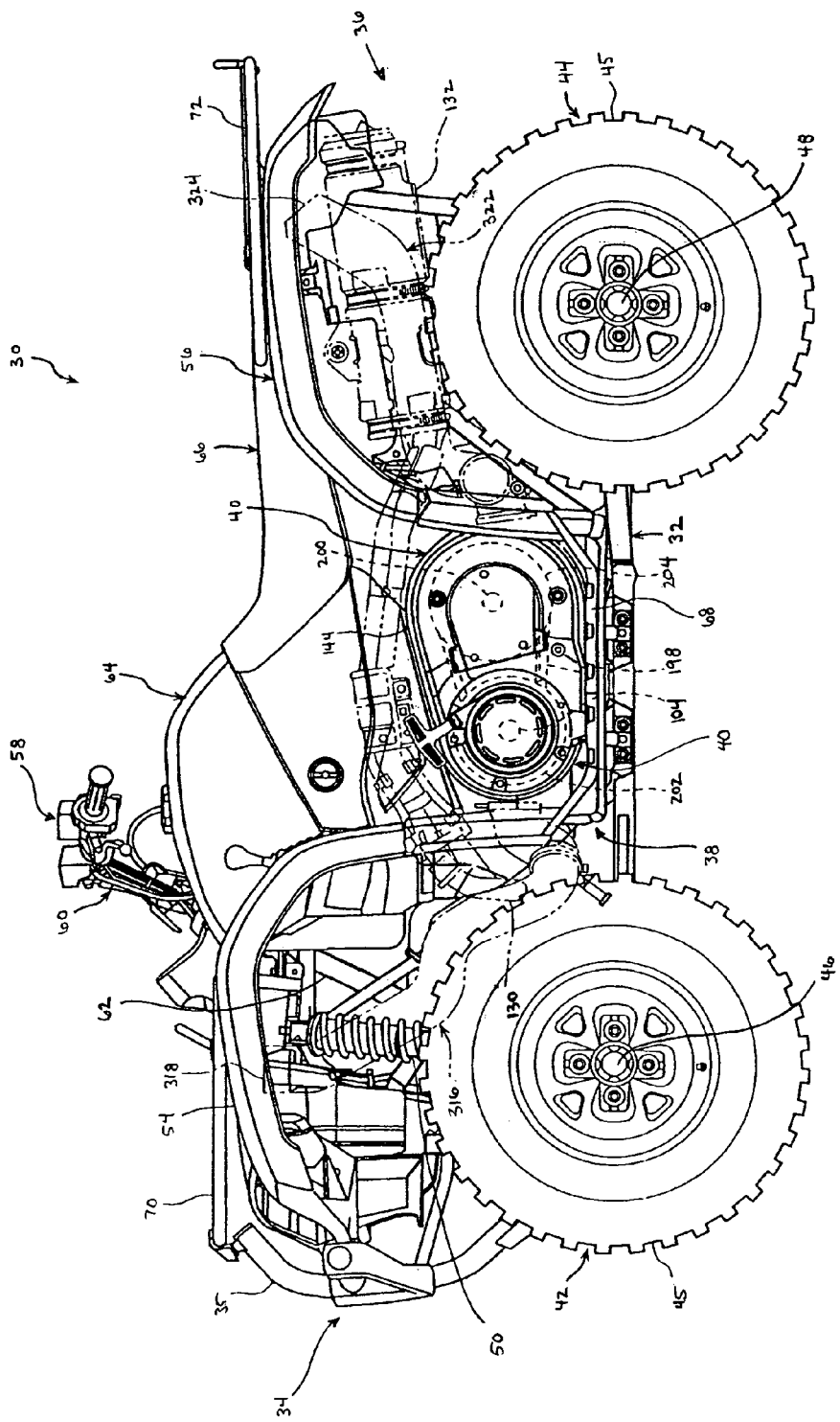
FIG. 1 is a side view of an offroad vehicle including front and rear wheels powered by an engine through a transmission.

FIGS. 1-11 illustrate a preferred embodiment of an engine structure for an offroad vehicle. Referring to FIG. 1, the offroad vehicle comprises an all-terrain vehicle 30 or "ATV." While the engine structure of the preferred embodiment is described with this particular type of vehicle 30, those of skill in the art will appreciate that the engine structure may have utility in a wide range of applications.

In FIG. 1, the all terrain vehicle 30 is shown in side view, the vehicle 30 having a frame 32. The frame 32 connects a front end 34 of the vehicle 30, the front end 34 having a front bumper 35, with a rear end 36 of the vehicle 30. An engine compartment 38 (i.e., a compartment in which the engine 40 is mounted) is defined by the frame 32, and an engine 40 is disposed within the engine compartment 38.

The frame 32 is rollably supported by a pair of front wheels 42 and a pair of rear wheels 44. The front and rear wheels 42, 44 having inflated tires 45. Each front wheel is mounted to a front axle 46, while the rear wheels 44 are mounted to a rear axle 48. As shown in FIG. 1, the front and rear axles 46, 48 extend transversely across the vehicle 30. The front and rear wheels 42, 44 are mounted for movement up and down with respect to the frame 32. As such, the connections of the wheels to the frame 32 are movable. A shock, strut or other suitable energy-absorbing member 50 is provided between the frame 32 and the front axle 46 and rear axle 48 or other supporting structure for each front and rear wheel. The shocks 50 are arranged to dampen the upward and downward movement of the wheels, as is well known to those of skill in the art. The front and rear wheels 42, 44 are driven by the engine 40 via an output shaft 52 (as shown in FIG. 2) connected to the front axle 46 and rear axle 48.

With continued reference to FIG. 1, a somewhat "C"-shaped front fender 54 extends from generally behind each front wheel 42 over the top thereof towards the front end 34 of the vehicle 30. Likewise, a rear fender 56 extends from generally in front of each rear wheel 44 over the top thereof towards the rear of the vehicle 30. The front and rear fenders 54, 56 are preferably constructed of a lightweight, corrosion resistant material such as a resin or plastic, and are mounted to the frame 32.

The front wheels 42 are steerably controlled by a steering handle 58 that is mounted to an upwardly extending steering shaft 60. The steering shaft 60 is mounted for rotation within a steering tube 62. The handle 58 is connected to the first end of the steering shaft 60, while the opposite end of the steering shaft 60 is coupled to an appropriate steering mechanism for steering the pair of front wheels 42.

Figure 2:
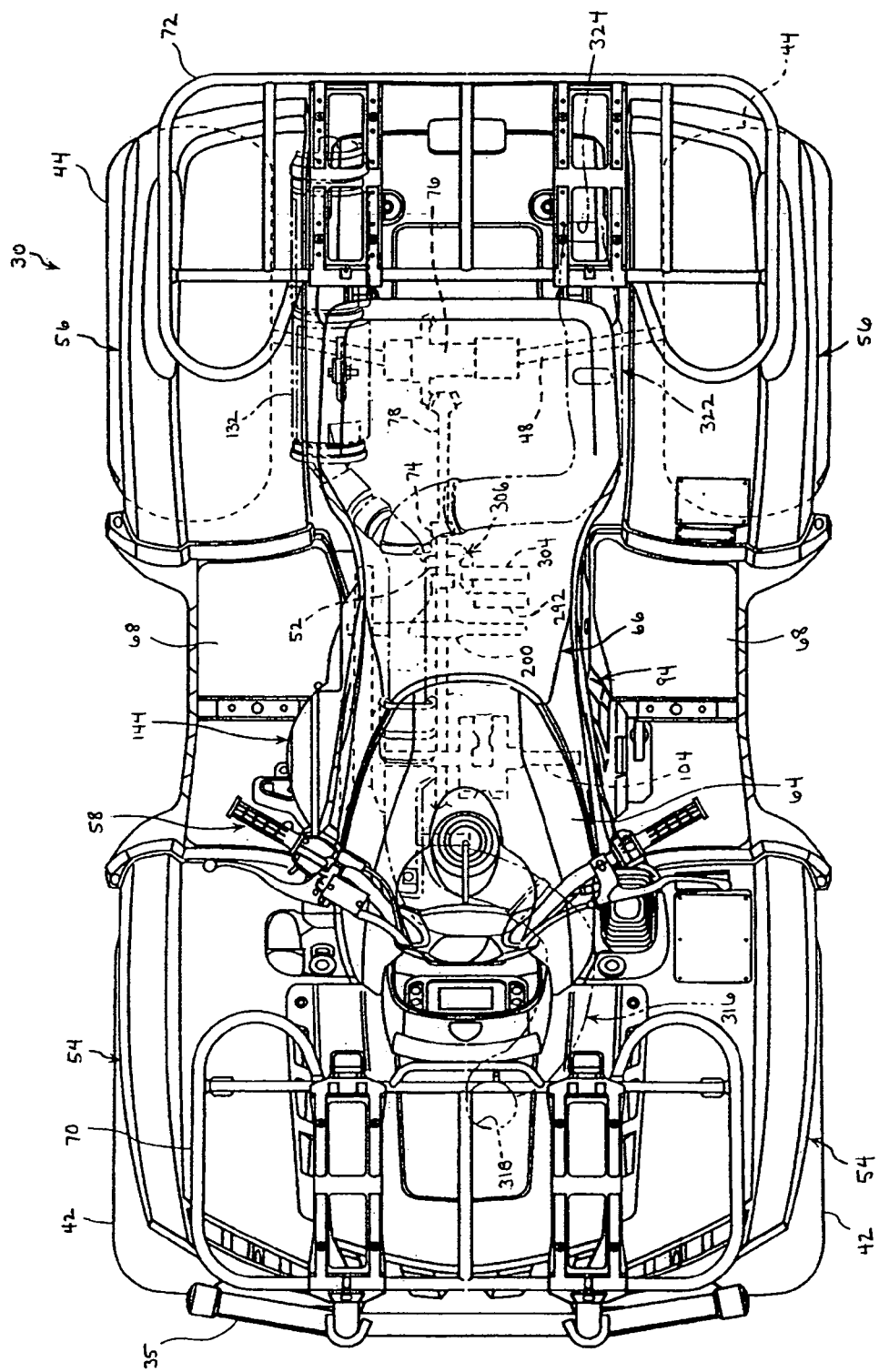
FIG. 2 is a top view of the offroad vehicle illustrated in FIG. 1 showing a drive train of the vehicle in phantom.

As shown in FIGS. 1 and 2, the vehicle 30 includes a fuel tank 64 that is disposed rearward of the steering handle 58. A seat 66 is positioned to the rear of the fuel tank 64, but close to the steering handle 58. Footboards 68 for supporting a user's feet are also disposed on the frame 32. The footboards 68 are positioned below the seat 66 on the left and right side of the vehicle 30 with respect to the user.

As illustrated in FIG. 2, a front carrying rack 70 is disposed frontward of the steering handle 58 so as to extend transversely over the front end 34 of the vehicle 30, the front carrying rack 70 being positioned above the front fender 54. A rear carrying rack 72 is disposed rearward of the seat 66 so as to extend transversely over the rear end 36 of the vehicle 30, positioned above the rear fender 56 and the rear wheels 44.

With continued reference to FIG. 2, preferably the rear wheels 44 are connected to a pair of rear axles 48. Each rear axle 48 extends between its respective rear wheel 44 and a rear differential 76, permitting individual movement of the wheels 44 with respect to one another. This type of differential 76 is well known to those of skill in the art. The rear differential 76 is arranged to transmit power from a rear drive shaft 78 to the pair of axles 48, the axles 48 being disposed so as to extend transverse to the drive shaft 78. The drive shaft extends longitudinally along the vehicle 30 as shown. The rear drive shaft 78 is connected to the main output shaft 52 via a universal joint 74. The main output shaft 52 is driven by the engine 40 of the vehicle 30. A similar arrangement is used to power the front wheels 42 of the vehicle 30.

Figure 3:
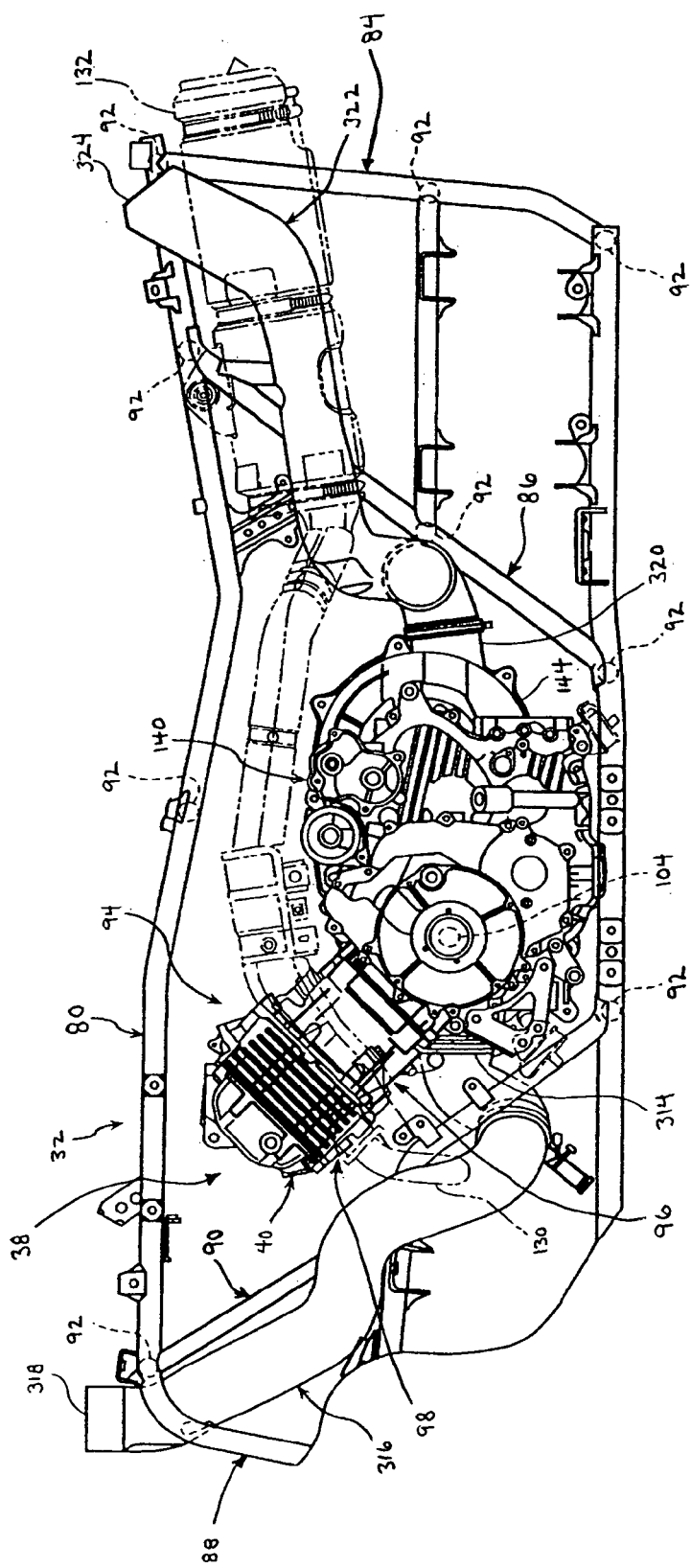
FIG. 3 is a side view of the engine located in an engine compartment defined within a frame of the vehicle.

As shown in FIG. 3, the frame 32 preferably is an open-type frame 32. The frame 32 includes a pair of spaced-apart substantially horizontal upper tubes 80. The frame 32 also includes a pair of spaced-apart substantially horizontal lower tubes 82. The upper tubes 80 are connected to the respective lower tube 82 by a pair of substantially vertical tubes 84. A pair of rearward diagonally extending supporting tubes 86 also connects the respective upper and lower tubes 82. The front end 34 of the frame 32 also includes a pair of substantially vertical tubes 88 and a pair of frontward diagonally extending supporting tubes 90 disposed between the upper and lower tubes 80, 82. The upper, lower, and diagonally extending pairs of tubes 80, 82, 86, 88, 90 are connected by transversely extending cross tubes 92. The upper and lower tubes 80, 82 and the diagonally extending supporting tubes 86, 90 generally define the engine compartment 38. As shown in FIG. 3, the engine 40 is disposed within the engine compartment 38.

The frame 32 may have a variety of constructions, with that described above being but one arrangement. The individual struts and tubes are preferably constructed of metal, and connected by welding or other suitable connections as well known in the art. As illustrated, the frame 32 includes a variety of other support elements which are not described in detail, as they are well known to those of skill in the art.

The manner by which the engine 40 powers the output shaft 52, and thus the front and rear wheels 44, is described in greater detail below.

The engine 40 is described with reference primarily to FIGS. 3 to 6. As illustrated, the engine 40 is of the internal combustion type, having a single cylinder and operating on a four-cycle principle. Those of skill in the art will appreciate that the engine 40 may have more than one cylinder and operate in accordance with other principles, such as a two-cycle principle, for example.

The engine 40 includes an engine body 94. The engine body 94 has a cylinder block 96 having a cylinder head 98 connected to a top end thereof. The cylinder block 96 and cylinder head 98 cooperate to define a single cylinder 99 (as shown in FIG. 4).

Figure 4:
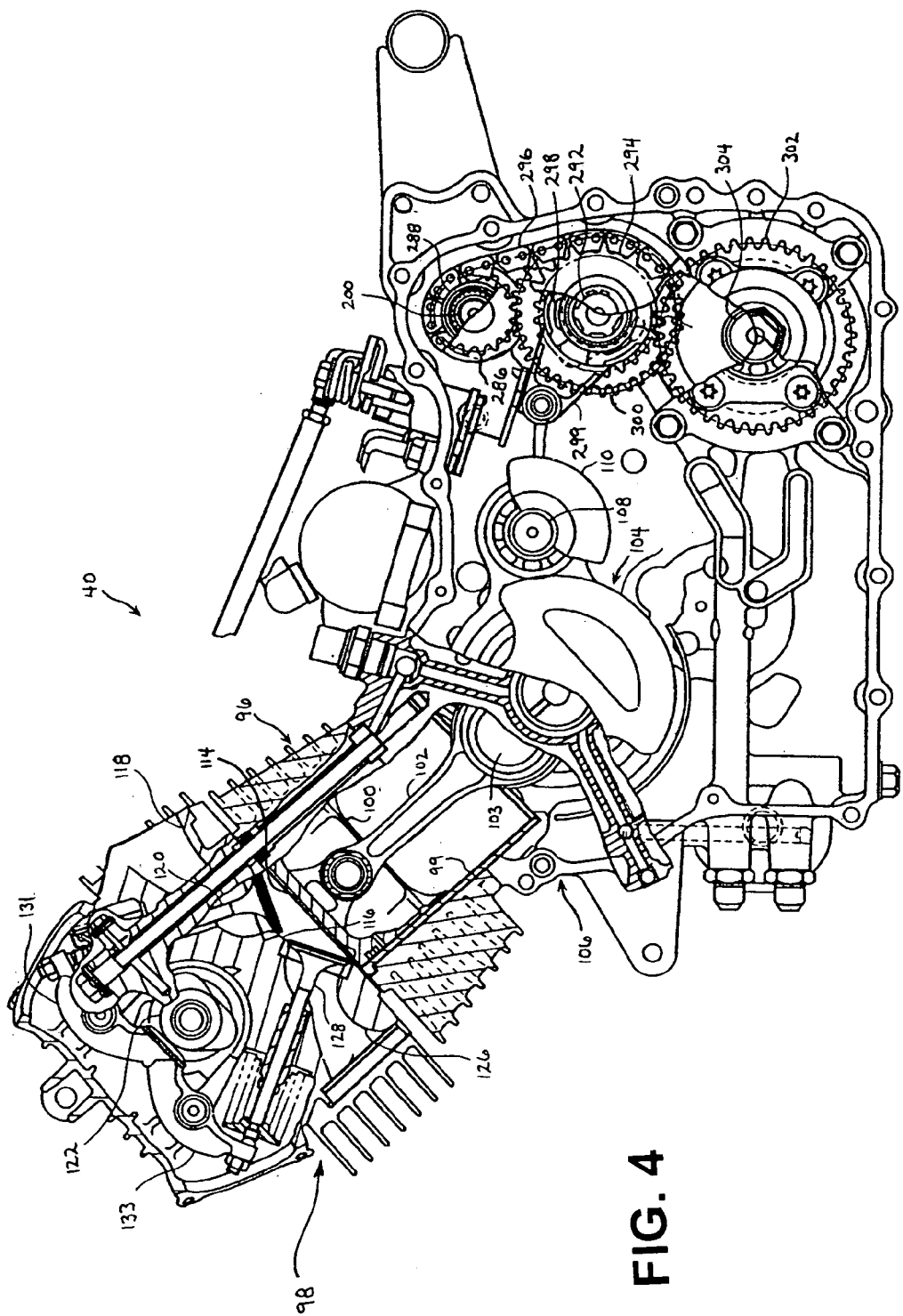
FIG. 4 is the side view of the engine of the vehicle in FIG. 1 with portions thereof removed to expose various internal portions of the engine.

In FIG. 4, a piston 100 is reciprocally supported within the cylinder 99. The piston 100 is connected via a connecting rod 102 and connecting pin 103 to a crankshaft 104. The crankshaft 104 is mounted for rotation within a crankcase 106. A balancer shaft 108 preferably is disposed behind the crankshaft 104 in parallel with the crankshaft 104. A balancer weight 110 located the balancer shaft 108 is disposed between the left and right crank arms 112 (shown in FIG. 5) of the crankshaft. The balancer shaft 108 is coupled for rotation with the crankshaft 104 to offset an imbalance created by moving components of the engine 40, such as the piston 100, for example. A top end surface of the piston 114 cooperates with the cylinder to define a combustion chamber 116 portion thereof.

Preferably, a mixture of fuel and air is supplied to the combustion chamber 116 via an intake port 118 from a carburetor (not shown). The manner by which carburetors operate and their construction is well known in the art. Those of skill in the art will also appreciate that the fuel may be injected with a fuel injector, either directly or indirectly.

With continued reference to FIG. 4, the air and fuel mixture that is supplied to the engine 40 selectively flows to the combustion chamber 116 through the intake port 118 as controlled by an inlet valve 120 or similar mechanism.

Preferably, this inlet valve 120 is operated by a camshaft 122. The camshaft 122 is mounted for rotation in the cylinder head 98 mounted to the top of the cylinder block 96.

A suitable ignition plug 124 (shown in FIG. 5) is provided for igniting the air and fuel mixture that is supplied to the combustion chamber 116. Preferably, the ignition plug 124 is screwed into the combustion chamber 116.

The products of combustion are selectively routed from the combustion chamber 116 through an exhaust port 126 as controlled by an exhaust valve 128. The exhaust flows through the exhaust port 126 and into an exhaust pipe 130 that leads to a muffler 132 positioned at the rear of the vehicle 30 (shown in FIG. 3). The exhaust is discharged from the muffler 132 to the atmosphere. The exhaust valve 128 is also preferably operated by the camshaft 122.

The camshaft 122 in is contact with an inlet rocker arm 131 and an exhaust rocker arm 133 such that rotation of the camshaft 122 actuates the rocker arms 131, 133 upward and downward. The rocker arms 131, 133 are connected to the inlet valve 120 and the exhaust valve 128 such that when the rocker arms 131, 133 are down, the valves 120, 128 are closed and when the rocker arms 131, 133 are up, the valves 120, 128 are open.

Figure 5:
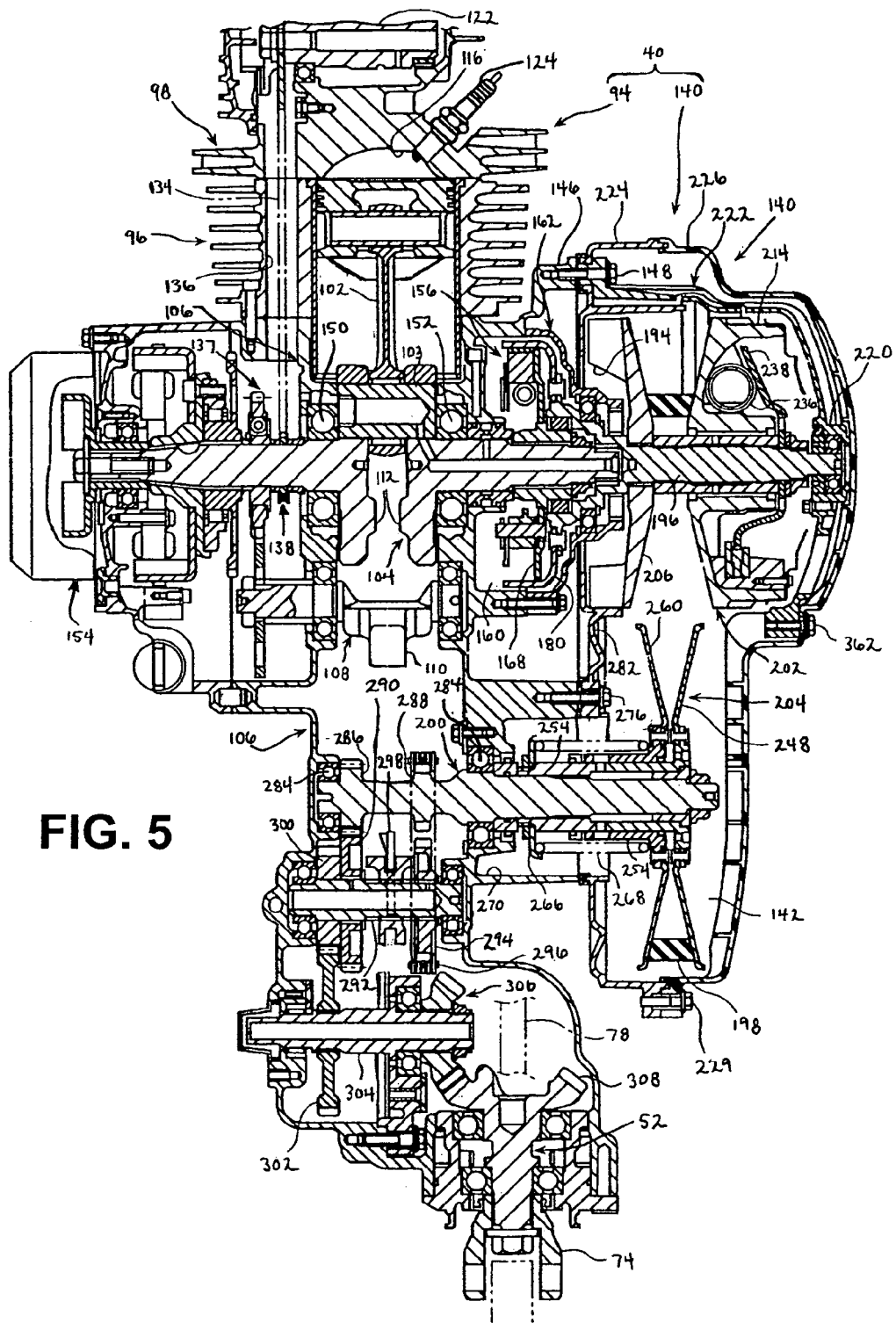
FIG. 5 is a cross-sectional view of the engine and the transmission.

In FIG. 5, a mechanism for rotating the camshaft 122 is illustrated. The camshaft 122 is driven by a cam chain 134 or other drive member which extends through a chamber 136 formed by the cylinder block 96 and head 98 from a crankcase chamber 137 within the crankcase 106. The cam chain 134 is driven by a cam chain drive gear 138 mounted on the crankshaft 104. Of course, the camshaft 122 could be belt or gear driven, as known to those of skill in the art.

Reciprocation of the piston 100 is converted into rotation of the crankshaft 104. The motion of the crankshaft 104 is used to drive the output shaft 52, and thus the wheels 42,44. The movement of the crankshaft 104 is transmitted to the output shaft 52 by a transmission 140.

The drive layout of the transmission 140 is described with reference to FIGS. 4-6. The transmission 140 is located in a transmission chamber 142 defined by a transmission cover 144 connected to a crankcase outer portion 146. The crankcase outer portion 146 includes a mating surface for mating with a corresponding surface of the transmission cover 144. The transmission cover 144 preferably is removably connected to the crankcase outer portion 146 with one or more fasteners, such as a bolt 148. The transmission cover 144 is preferably constructed of a lightweight, corrosion resistant material such as a resin or plastic.

The crankshaft 104 is supported for rotation within the crankcase 106 by first and second main bearings 150,152. The main bearings 150,152 are supported by the crankcase 106.

An electric starter 154 is provided at one end of the crankshaft 104, as illustrated in FIG. 5. Preferably, this starter 154 is powered by an electric source and activated by a start button mounted on or near the steering handle 58 of the vehicle 30. The transmission 140 is driven from an end of the crankshaft 104 generally opposite the starter 154.

Figure 6:
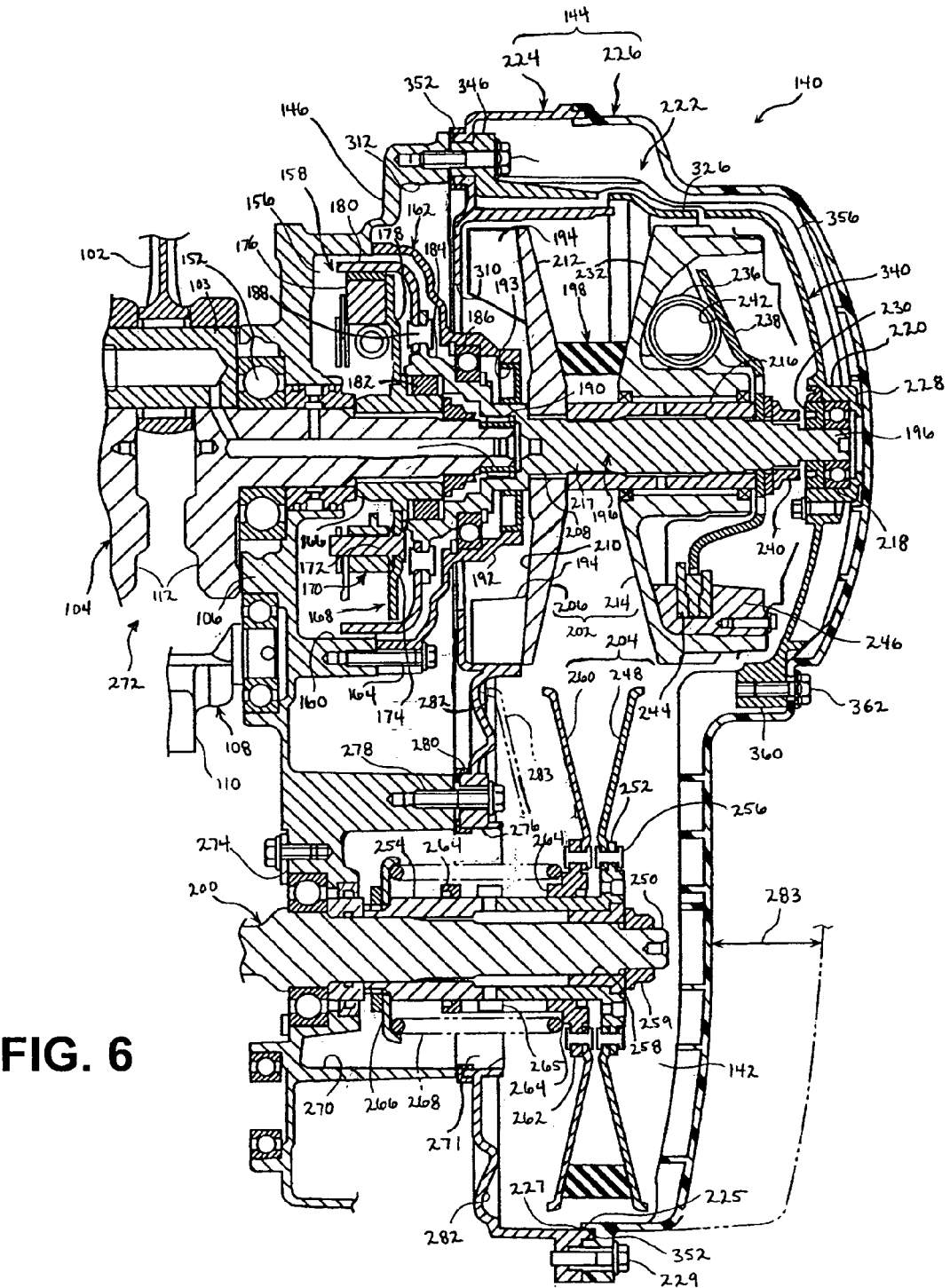
FIG. 6 is an enlarged cross-sectional view of the transmission, showing a width of the transmission in phantom.

In FIG. 6, the transmission 140 includes a clutch 156. In the embodiment illustrated, the clutch 156 includes a centrifugal clutch 158 which is mounted in a clutch chamber 160. The clutch chamber 160 is defined by the crankcase outer portion 146 and a clutch dividing wall 162. In the embodiment illustrated, the clutch dividing wall, or bracket 162, is supported by the crankcase outer portion 146, and includes at least one portion which may be disconnected therefrom by removing one or more fasteners, such as a bolt 164.

A clutch input shaft 166 is connected to an end of the crankshaft 104 which extends beyond the second main bearing 152. An inner plate 168 is coupled to the clutch input shaft 166. A weighted shoe element 170 is supported by a pin 172 connected to a first end of the plate 174. The pin 172 is arranged to rotate, whereby the shoe element 170 moves between an extended position and retracted position. A second shoe element 176 is mounted at an opposite end 178 of the plate 174. The shoe elements 170, 176 are arranged to selectively drive a second clutch plate 180.

The clutch 156 also includes a one-way clutch 182 which is connected to the clutch input shaft 166 and spaced from the clutch plate 180. The one-way clutch 182 is positioned between the clutch input shaft 166 and a clutch output shaft 184. This one-way clutch 182 serves to permit driving rotation of the clutch output shaft 184 with respect to the clutch input shaft 166 in only one direction. In particular, the one-way clutch 182 is arranged to engage only when the speed of the clutch output shaft 184 is greater than that of the clutch input shaft 166. This one-way clutch 182 may comprise a sprag-type clutch.

The clutch output shaft 184 is supported on its exterior for rotation with respect to the clutch dividing wall 162 by a third bearing 186. The clutch output shaft 184 also supports the second clutch plate 180. The second clutch plate 180 extends radially outward from the shaft and is connected thereto with one or more rivets 188 or other fasteners. A fourth bearing 190 is provided on the outside of the end of the crankshaft 104 but inside of the clutch output shaft 184. This bearing rotatably supports the clutch output shaft 184 from the inside.

The shoe elements 170, 176 are arranged to selectively engage the second clutch plate 180. In the position of the shoe elements 170, 176 as illustrated by the first shoe element 170, when the engine 40 speed is low, the shoe elements 170, 176 do not contact the plate and thus do not drive the plate 180 (and the connected clutch output shaft 184). If the speed of the vehicle 30 is low (or not moving), then the crankshaft 104 does not drive the clutch output shaft 184. If the speed of the engine 40 is high, then the shoe elements 170, 176 move to the position as illustrated by the second shoe element 176, where the shoe elements 170, 176 engage the second plate 180. At that time, the crankshaft 104 drives the clutch output shaft 184 through the centrifugal clutch 158.

If at any time the speed of rotation of the clutch output shaft 184 is higher than that of the engine 40 (i.e. clutch input shaft 166), then the one-way clutch 182 engages. When this clutch engages, the speed of rotation of the clutch output shaft 184 is slowed by its connection to the slower clutch input shaft 166, and engine braking of the vehicle 30 occurs.

The clutch dividing wall 162 is sized and configured to rotatably support the clutch output shaft 184 via the third bearing 186. The clutch dividing wall 162 further comprises a cylindrical protuberance 192 toward the radial center of the clutch dividing wall 162, supporting the clutch output shaft 184 by an opening 193 through which the output shaft 184 extends. The cylindrical protuberance 192 allows disposition of the third bearing 186 within the protuberance. The cylindrical protuberance 192 also permits air-cooling fins 194 (described below) to be located closer to the clutch 156 by the length of the cylindrical protuberance 192. By positioning the air-cooling fins 194 closer to the clutch 156, the engine 40 width may be reduced, thereby preventing interference with the user's feet while using the all-terrain vehicle 30.

The clutch output shaft 184 extends beyond the clutch dividing wall 162 to form a primary shaft 196. The primary shaft 196 is driven by the crankshaft 104 through the clutch 156. Thus, the primary shaft 196 is an input, or drive shaft, of the transmission 140. With reference to FIG. 5, the primary shaft 196 extends in alignment with the crankshaft 104, transversely across the vehicle 30.

The primary shaft 196 is arranged to drive a "V"-belt, or drive belt 198, or similar drive member which is used to drive a main shaft 200, or driven shaft of the transmission 140, described in more detail below. In this regard, the transmission 140 has a drive pulley 202 and a driven pulley 204. The transmission 140 is provided with drive and driven pulleys 202, 204 for the reason that this arrangement permits the engine 40 to drive the wheels 42, 44, and so that the motion of the crankshaft 104 may be transmitted to the main output shaft 52, which as illustrated in FIG. 5, is offset some distance therefrom.

A first drive sheave 206 is mounted upon the primary shaft 196. This sheave 206 is fixed in position on the primary shaft 196 by one or more splines 208. The first sheave 206 has a generally flat surface 210 which faces in the direction of the crankshaft 104. The first sheave 206 has an opposing conical surface 212.

One or more fins 194 preferably extend outwardly from this flat surface 210. These fins 194 move air through the transmission chamber 142 for cooling the "V"-belt 198. The manner by which the "V"-belt 198 is cooled by this air is discussed in greater detail below.

A second sheave 214 is movably mounted on a collar 216 extending over the shaft 196. The collar 216 is fixed to the primary shaft 196 by an interlocking spline arrangement 217. This sheave 214 is spaced some distance from the first sheave 206. The first and second sheaves 206,214 constitute the drive pulley 202.

As illustrated, the primary shaft 196 is supported at its end opposite the crankshaft 104 by a support bearing 218. This support bearing 218 is supported by a bearing bracket 220 supported from the crankcase outer portion 146. The bearing bracket 220 further includes a bearing retaining portion 228, or pocket, on the support bracket 222. The support bearing 218 is mounted in sealed fashion within the bearing retaining portion 228. A seal 230 is provided between the transmission chamber 142 and the bearing 218.

The transmission cover 144 surrounds the support bracket 222 and includes an inner transmission cover 224 and an outer transmission cover 226. The outer transmission cover 226 includes a peripheral groove 225 into which an edge 227 of the inner transmission cover 224 is fitted. On the rearward portion of the transmission cover 144, the inner and outer transmission covers 224, 226 are connected by one or more bolts 229.

As described above, the second sheave 214 is mounted on the primary shaft 196 so as to be movable along an axis thereof. The second sheave 214 has a conical surface 232, which faces the conical surface 212 of the first sheave 206. The "V"-belt 198 is engaged on either side by these conical surfaces 212,232.

The opposing side of the second sheave 214 defines a cam surface 234. One or more centrifugal weights 236 engage this surface 234. The centrifugal weights 236 are positioned in an area defined by the cam surface 234 and a cam plate 238. The cam plate 238 is mounted between the second sheave 214 and the end of the primary shaft 196. As illustrated, the cam plate 238 abuts the end of the collar 216 and is secured in position with a nut 240.

The cam plate 238 has a sloping surface 242 which engages the centrifugal weight 236, opposite the cam surface 234 of the second sheave 214. This surface 242 slopes in the direction towards (i.e. gets closer to) the sheave 214 moving radially outward from the shaft 196. Thus, a distance between the cam surface 234 and the sloping surface 242 gets smaller when moving radially outward.

The cam plate 238 has a portion generally opposite that portion which defines the sloping surface 242 on which is mounted a slider 244. The slider 244 is positioned within a guide part 246 defined by the second sheave 214. Mounting of the slider 244 within the guide part 246 causes the cam plate 238 to rotate with the second sheave 214 at the same speed.

In accordance with this arrangement, when the clutch 156 is engaged and the engine 40 is turning the crankshaft 104 at low speed, the primary shaft 196, and thus the first and second sheaves 206, 214 rotate at a low speed. At this time, the second sheave 214 is biased by the weight 236 so that it is positioned along the primary shaft 196 closest to its outer end (i.e., the weight 236 is radially inward).

When the engine 40 speed increases, and thus the rotational speed of the sheaves 206, 214 increases, the centrifugal weight 236 moves radially outward, riding on the cam surface 234 and sloping surface 242. The movement of the centrifugal weight 236 (because the cam plate 238 is fixed) causes the second sheave 214 to move towards the first sheave 206 along the primary shaft 196. As the distance between the first and second sheaves 206, 214 decreases, the "V"-belt 198 is moved radially outwardly along the conical surfaces 212, 232.

Referring to FIG. 5, the "V"-belt 198 drives the main shaft 200, which is rotatably supported by the crankcase 106. A fixed sheave 248 is mounted at an outer end 250 of the main shaft 200. Preferably, the fixed sheave 248 is mounted to a flange portion 252 of a fixed sleeve 254 by rivets 256 or other suitable fasteners. A hollow, cylindrical portion of the fixed sleeve 254 extends over the end of the shaft 200. The fixed sleeve 254 is preferably coupled for rotation with the main shaft 200 by an interlocking spline arrangement 258. A nut 259 on the outer end 250 of the main shaft 200 supports the fixed sleeve 254 in the axial direction.

A movable sheave 260 is also coupled to the main shaft 200. The movable sheave 260 is mounted on a flange 262 of a slide collar 264. The slide collar 264 is capable of axial movement over the fixed sleeve 254. A guiding pin 265 is secured to fixed sleeve so as to engage the slide collar 264 and thus rotate the movable sheave 260. In this arrangement, the movable sheave 260 rotates together with the fixed sheave 248.

The slide collar 264 is, in turn, slidingly supported on the fixed sleeve 254 and is positioned on the main shaft 200 between the fixed sheave 248 and a spring stop 266.

It is noted that the fixed and movable sheaves 248,260 each have conical surfaces facing one another and which engage the belt 198, just as the sheaves described above. The fixed and movable sheaves 248,260 constitute the driven pulley 204.

A spring 268, such as a helical spring, is positioned between the spring stop 266 and the movable sheave 260. The spring 268 biases the movable sheave 260 toward the fixed sheave 248. When the speed of the engine 40 is high, the centrifugal weight 236 causes the second sheave 214 on the drive pulley 202 to move toward the first sheave 206, thus decrease the distance between the two sheaves. The decreasing distance causes the belt 198 to rise on the drive pulley 202. As the belt 198 rises on the drive pulley 202, the belt exerts force on the driven pulley 204. The force is transmitted to the fixed and movable sheaves 248, 260, causing the movable sheave 260 to exert a force on the spring 268. As the spring 268 force is overcome, and the belt 198 moves the movable sheave 260 away from the fixed sheave 248, the belt 198 moving to a lower position on the driven sheaves 248, 260.

A spring cavity 270 is defined within the crankcase 106 through which the main shaft 200 extends, the spring stop 266 being supported by the crankcase 106. The spring 268 extends from the spring stop 266 to the slide collar 264.

The crankcase outer portion 146 constitutes a mating surface between transmission inner case 224 and the crankcase 106. The mating surface defines a plane that is substantially perpendicular to the axis of the main shaft 200. The spring 268 is disposed so as to be positioned within the crankcase 106 such that a portion of the spring 268 is on a first side of the mating surface between the crankcase 106 and the transmission cover 144, and a portion of the spring 268 is on the opposite side of the mating surface. Preferably one-third the axial length of the spring 268 under minimum load is accommodated within the spring cavity 270.

The spring cavity 270 is in communication with the transmission chamber 142 via a communication opening 271 in the and inner transmission case 224. The spring cavity 270 is isolated from a crank chamber 272 by a main shaft supporting wall 274.

Reinforcing portions 276 are provided on the inner transmission case 224 for connection with the crankcase outer portion 146. At the reinforcing portions 276, the inner transmission case 224 is connected to the crankcase outer portion 146 by bolts 278. Between the inner transmission case 224 and the crankcase outer portion 146, a sealing member 280 is disposed. At least one of the bolts 278 is displaced toward the radial center of the main shaft 200 such that the bolt 278 is within the perimeter of the movable sheave 260 of the driven pulley 204.

The inner transmission case 224 is formed with a circular channel 282 that is concave with respect to the transmission chamber 142. When the movable sheave 260 is moved to a position where the belt 198 is in a radially inwardmost position on the driven sheaves 248,260 (as shown in phantom 283 in FIG. 6), the circular channel 282 is sized and configured to accommodate the peripheral portion of the movable sheave 260, whereby interference with the inner transmission case 224 and crankcase outer portion 146 is prevented. With the bolts 278 connecting the inner transmission case 224 and the crankcase outer portion 146 displaced toward the radial center of the main shaft 200, interference with the bolts 278 is also prevented.

Because about one-third of the spring 268 is disposed within the crankcase 106 in the direction of the crank chamber 272, the main shaft 200 with the fixed and movable sheaves 248,260 may be disposed in the direction of the crank chamber 272 correspondingly. Therefore, the width of the transmission cover 144 can be reduced by a length 283 (as shown in FIG. 6), whereby interference with the feet of the user can be avoided. In addition, with the spring 268 disposed in the crankcase 106, rigidity of the crankcase 106 can be increased and, simultaneously, a space for disposing the spring 268 is provided.

With the spring cavity 270 in communication with the transmission chamber 142, the transmission chamber 142 and the crank chamber 272, which is filled with lubricant, are isolated by the main shaft supporting wall 274 of the spring cavity 270.

With the overlap configuration of the cooling fins 194 with the clutch dividing wall 162, the drive pulley can be disposed inside by the length of the cylindrical protuberance 192, thus further reducing the size of the engine 40.

The fixed and movable sheaves 248,260 are positioned along the main shaft 200 so that they generally align with the first and second sheaves 206,214 mounted on the primary shaft 196. In this manner, the "V"-belt 198 rotates within a plane extending between the two shafts 196,200 and is not twisted, offset or the like, thereby extending the life of the belt 198.

As illustrated in FIG. 5, the end of the main shaft 200 that supports the sheaves 248,260 is cantilevered within the transmission chamber 142. The opposing end is rotatably supported by a number of bearings 284. These bearings 284 are preferably supported by the crankcase 106.

A first and second gear 286, 288 is mounted on the main shaft 200. The first gear 286 is arranged to drive a third gear 290 on a first transfer shaft 292. The second gear 288 on the main shaft 200 is arranged to selectively drive a fourth gear 294 on the first transfer shaft 292 via a chain 296, so that the direction of travel can be switched between a forward movement and a reverse movement by a dog clutch 298 on the first transfer shaft 292, the dog clutch having a switching fork 299. In one position, dog clutch 298 on the first transfer shaft 292 is arranged to fix the third gear 290 for rotation with the first transfer shaft 292. Then the first gear 286 moves the third gear 290 and the first transfer shaft 292. In this position, the main shaft 200 is arranged to drive the first transfer shaft 292 in a direction which corresponds to a forward driving direction for the vehicle 30.

On the other hand, when the dog clutch 298 is moved in the opposite direction, the third gears 290 is disengaged from the first transfer shaft 292 and the fourth gear 294 is engaged with the first transfer shaft 292, whereby the second gear 288 drives the first transfer shaft 292, via the chain 296 and the fourth gear 294, in the same direction as the rotation of the main shaft 200. Preferably, a shift lever (not shown) is provided near the steering handle 58 for use by the vehicle 30 user to control the dog clutch 298.

A fifth gear 300 is mounted on the first transfer shaft 292 and is arranged to drive a sixth gear 302 mounted on a second transfer shaft 304. A bevel gear 306 is positioned on an end of the second transfer shaft 304 opposite the sixth gear 302 and is driven thereby. This bevel gear 306 drives a mating bevel gear 308 mounted on the main output shaft 52. In this manner, the rotation of the second transfer shaft 304 is translated ninety degrees to drive the main output shaft 52 which extends longitudinally along the vehicle 30. As stated above, the output shaft 52 drives the front and rear drive shafts 78 to drive the wheels 42,44 in either a forward or rear direction.

As shown in FIGS. 5 and 6, cooling air is introduced into the transmission chamber 142 through an air-introducing opening 310 in the inner transmission case 224. Air is communicated to the air-introducing opening 310 by an air-introducing cavity 312 in the crankcase outer portion 146. An air-introducing port 314 communicates with the air-introducing cavity 312 within the engine 40 and an air-introducing pipe 316 outside the engine 40 (as shown in FIG. 3). The air-introducing pipe 316 extends to an air intake port 318 preferably disposed beneath the front fender 54 and transversely located at the center of the vehicle 30.

A cooling air exhaust port 320, which communicates with the transmission chamber 142, is formed on the rear wall of the transmission cover 144 (as shown in FIG. 3). An exhaust pipe 322 is connected to the exhaust port 320, and a discharge port 324 of the exhaust pipe 322 preferably opens beneath the rear fender 56, on the side opposite from the muffler 132.

Figure 7:
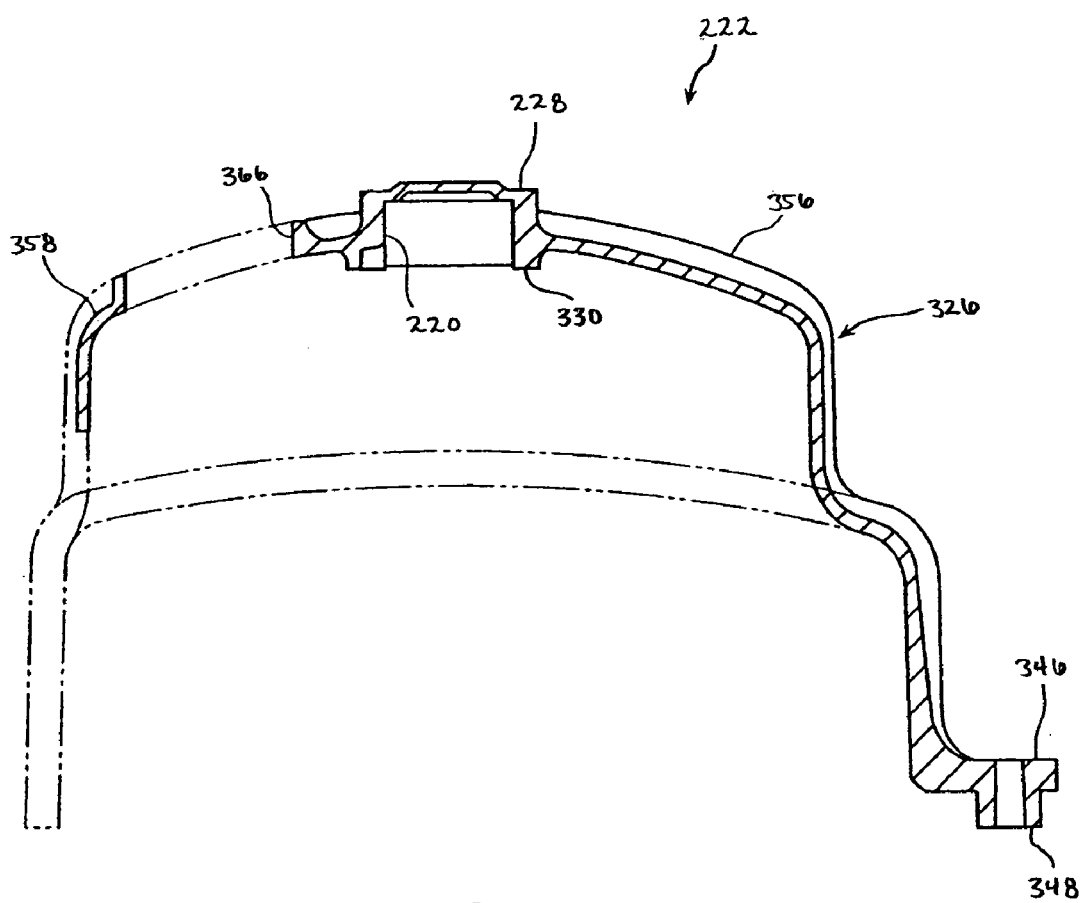
FIG. 7 is a cross-sectional view of a support bracket of the transmission of FIG. 6.

With reference to FIG. 7, the support bracket 222 comprises an air guide 326 for directing cooling air that is introduced into the transmission chamber 142. Preferably, the cooling air is directed toward the "V"-belt 198 by the air guide 326.

The support bracket 222 preferably is formed of die-cast aluminum and includes the bearing retaining portion 228. The bearing retaining portion 228 comprises a reinforced cylindrical portion 330 that is open-faced toward the crankshaft 104, constituting the bearing bracket 220. A support bearing 218 is inserted into the bearing bracket 220 and rotatably supports the primary shaft 196 therein, as discussed previously.

Figure 8:
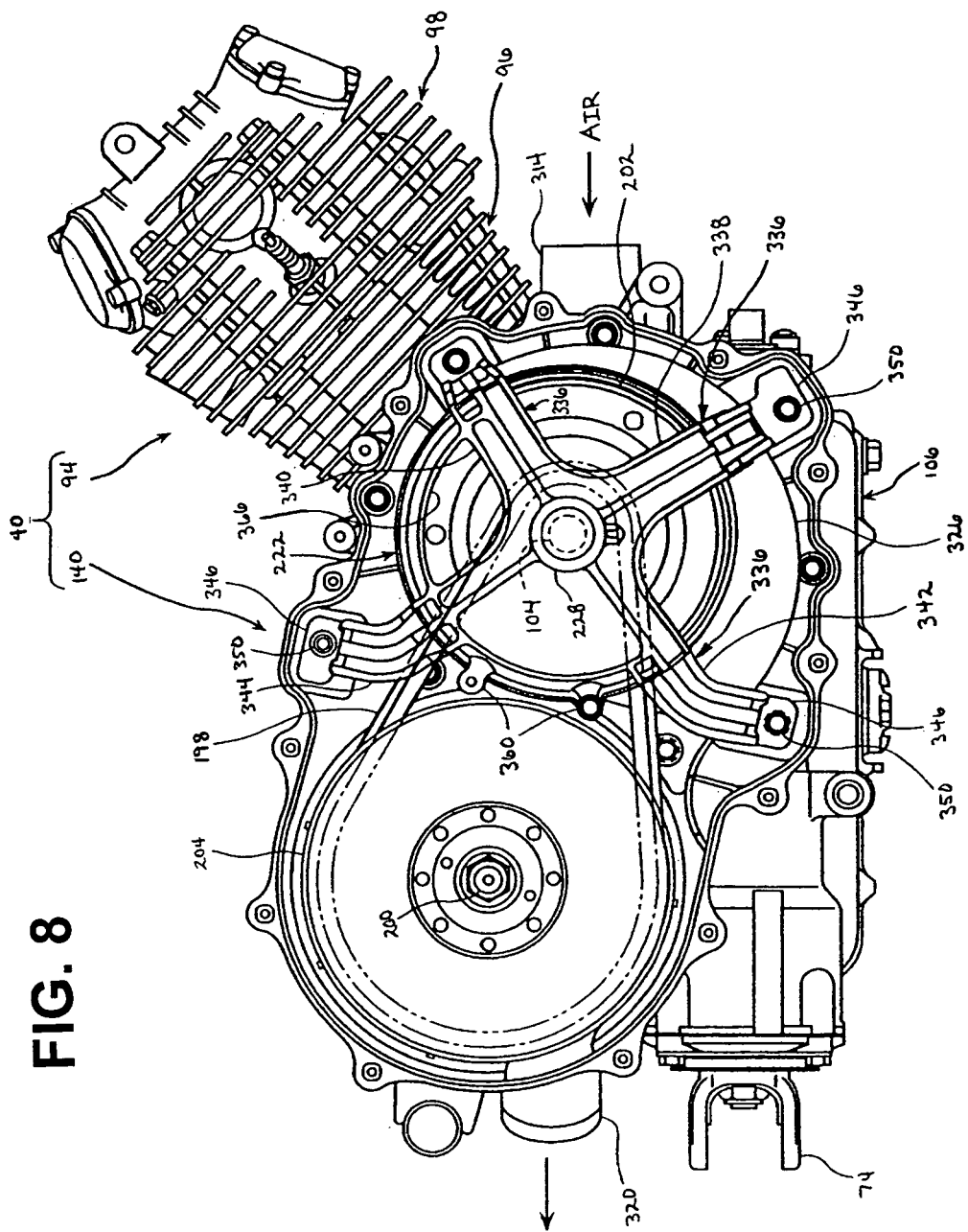
FIG. 8 is a side view of the transmission and engine of the vehicle, shown opposite of the view in FIGS. 3 and 4.

The support bracket 222 further comprises one or more legs 336 (as illustrated in FIG. 8), extending from the bearing retaining portion 228. Preferably, the support bracket 222 is provided with four legs: a front bottom 338, a front top 340, a rear bottom 342, and a rear top 344. The four legs 336 extend from the bearing retaining portion 228, intersecting at the bearing retaining portion 228 and forming a cross-structure.

The legs 336 extend radially outward from the bearing retaining portion 228 in a longitudinal direction, substantially perpendicular to direction of the crankshaft 104. The legs 336 extend in the longitudinal direction until the legs 336 exceed a circumferential perimeter of the drive sheaves 206, 214, whereupon the legs 336 are then directed in a transverse direction, substantially parallel to the crankshaft 104 so as to encircle the drive sheaves 206, 214 and "V"-belt 198 (as shown in FIG. 7).

Figure 9:
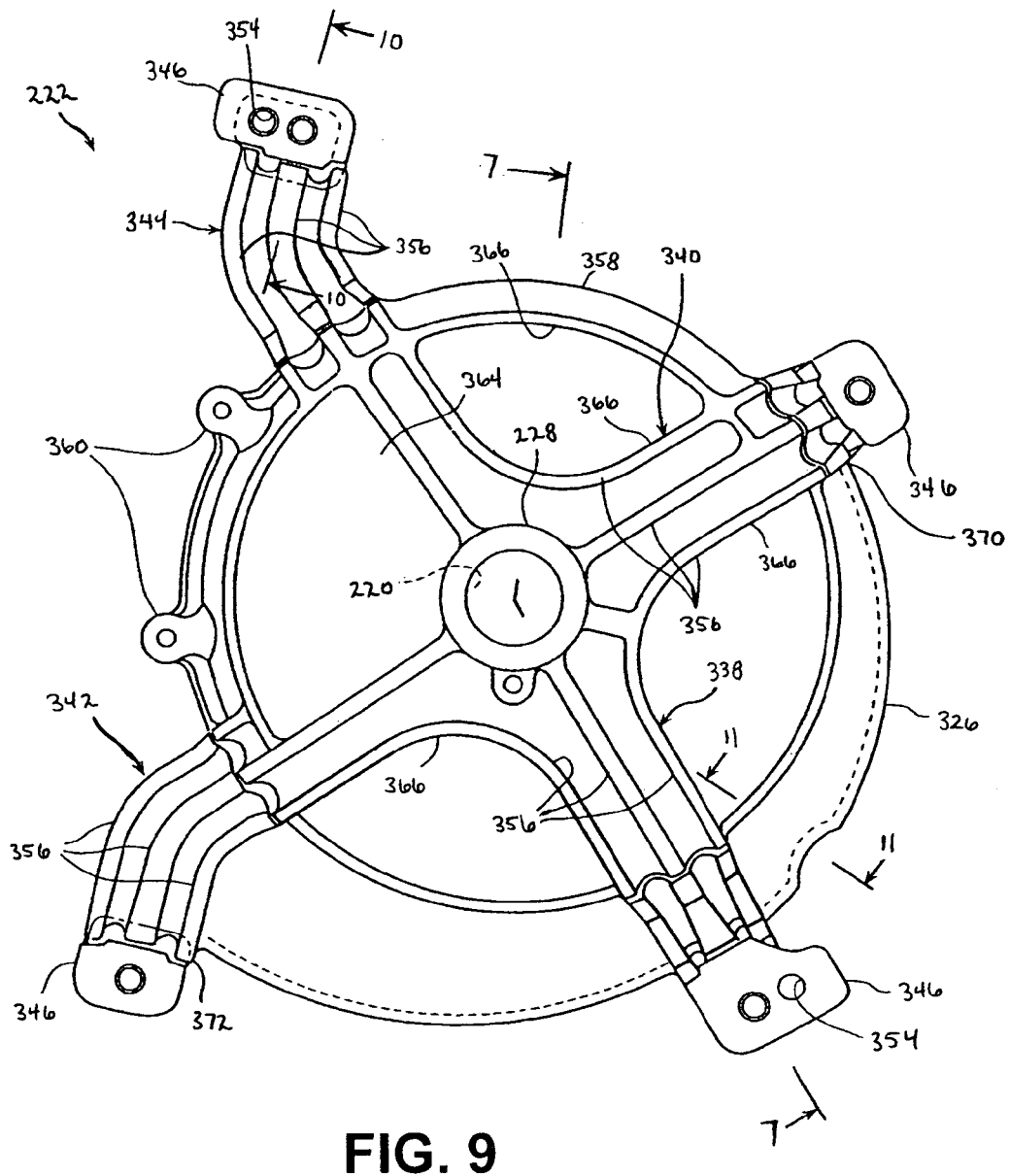
FIG. 9 is a side view of the support bracket of the transmission showing an air guide.
Figure 10:
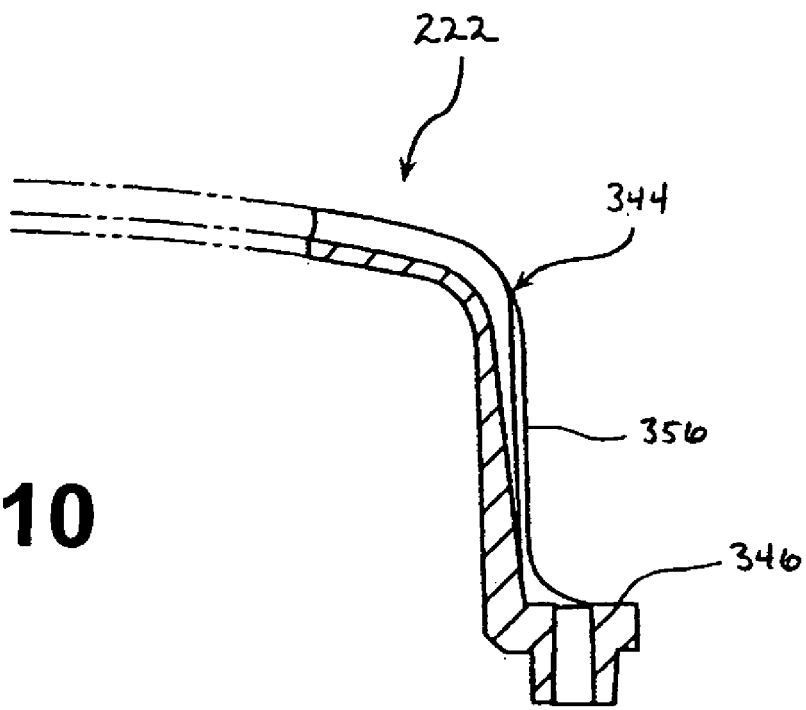
FIG. 10 is a cross-sectional view of a leg of the support bracket of FIG. 9.
Figure 11:
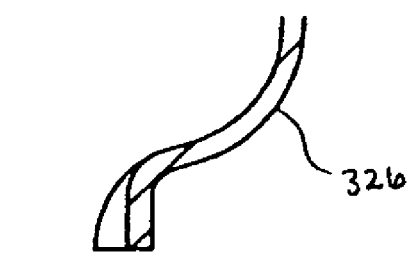
FIG. 11 is a cross-sectional view of the air guide of FIG. 9.

As shown in FIG. 7, the legs 336 terminate at flange portions 346 that are bent out in a direction perpendicular to the crankshaft 104 so as to provide a mating surface 348 that is connected to the crankcase 106 via a bolt 350 and the connection is provided with a seal 352 disposed therebetween. The flanges 346 may further comprise one or more positioning holes 354 disposed thereon (as shown in FIG. 9). The positioning holes 354 may be used for aligning the support bracket 222 on the crankcase 106. For example, the positioning holes 354 may slide over positioning pins.

Referring to FIGS. 8 and 9, the legs 336 are provided one or more ribbed reinforcing portions 356 that extend along the length of the legs 336. The ribbed reinforcing portions 356 terminate at the bearing retaining portion 228 on one end and the flanges 346 on the other end.

The rear top and bottom legs 344, 342 are bent away from the direction of the primary shaft 196 and main shaft 200 such that the rear top and bottom legs 344, 342 extend in a direction that is substantially perpendicular to a force exerted on the primary shaft 196 by the drive belt 198. Because the legs are configured in this arrangement, greater support is provided by the support bracket 222 via the legs 342, 344. Also, as the legs 342, 344 are directed away from the "V"-belt 198, interference with the "V"-belt 198 can be prevented. Because the legs 342, 344 avoid interference with the "V"-belt 198 in this arrangement, the support bracket 222 and the crankcase 106 may be reduced in size, further accommodating the user of the vehicle 30.

Continuing reference to FIGS. 8 and 9, the legs 336 are further supported by a reinforcing member 358 that extends along the circumference of the support bracket 222. Preferably, the reinforcing member 358 interconnects each of the legs 336. The reinforcing member 358 preferably is circular with a diameter about the same size as the diameter of the drive pulley 202. The legs 336 extend radially from the bearing retaining portion 228 substantially perpendicular to the direction of the crankshaft 104. When the legs 336 reach the reinforcing member 358, the legs 336 are bent inward toward the crankcase 106 such that they extend in a direction substantially parallel to the direction of the crankshaft 104. The reinforcing member 358 further comprises one or more mounting portions 360 whereby the outer transmission cover 226 may be connected thereon by a bolt 362 (as shown in FIG. 6).

The support bracket 222 between the rear top and bottom legs and reinforcing member 358 comprises a lid portion 364. The support bracket 222 between the other legs 336 and the reinforcing member 358 comprises openings 366 that communicate with the transmission chamber 142.

An air guide 326 is integrally formed with the support bracket 222. The air guide 326 extends along at least a portion of the outside circumference of the second drive sheave 214. Preferably, the air guide 326 extends between the front upper leg 340 and the rear lower leg 342. The air guide 326 preferably is formed into a spiral from a beginning of the air guide 370 to the end of the air guide 372 such that the air guide 326 is displaced radially from the bearing retaining portion 228 increasingly from the beginning to the end (as shown in FIG. 9). Accordingly, cooling air introduced into the transmission chamber 142 is concentrated on the "V"-belt 198 by the air guide 326.

The air guide 326 is formed into a spiral to provide a pressure differential between the beginning of the air guide 370 and the end of the air guide 372. The beginning of the air guide 370 has a smaller cross-sectional area than the end of the air guide 372 such that the air pressure at the beginning of the air guide 370 is higher than at the end of the air guide 372. This pressure differential draws air from the beginning of the air guide 370 to the end of the air guide 372 whereupon it is concentrated on the "V"-belt 198.

The support bracket 222 provides the structure for both the outer portion of the primary shaft 196 and an air guide 326 whereby the "V"-belt 198 is cooled by air introduced into the transmission chamber 142. Consequently, deterioration of the "V"-belt 198 due to a high range of temperatures can be reduced, increasing the life of the "V"-belt 198. The bearing bracket 220 supports the primary shaft 196, thereby increasing the life of the primary shaft 196.

The cooling air guide 326 also provides support for the primary shaft 196 because it is connected to the reinforcing member 358 which connects the legs 336 of the support bracket 222. The legs 336, in turn, support the bearing retaining portion 228 which supports the bearing bracket 220. The bearing bracket 220 rotatably supports the primary shaft 196. Therefore, the cooling air guide 326 also provides a reinforcing function, and rigidity of the entire support bracket 222 can be improved, thus increasing the reliability of the primary shaft 196.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present invention has been described in the context of particularly preferred embodiments, the skilled artisan will appreciate, in view of the present disclosure, that certain advantages, features and aspects of the system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. An all terrain vehicle comprising a frame, an engine compartment defined within the frame, an engine mounted within the engine compartment, the engine comprising a crankcase, a transversely extending crankshaft, a transmission connected to the crankshaft and disposed within a transmission chamber, the transmission comprising a drive pulley, a driven pulley and a drive belt connecting the drive pulley and the driven pulley, a transmission primary shaft connected to the drive pulley, a first end of the primary shaft supported by the crankshaft and a second end of the primary shaft supported by a support bracket, the support bracket connected to the crankcase, an air inlet adapted to permit entry of cooling air into the transmission chamber, an air guide configured to direct a flow of cooling air within the transmission chamber along the drive belt, wherein the air guide is connected to the support bracket.

2. The all terrain vehicle of claim 1, wherein the air guide extends along at least a portion of the outside circumference of the drive pulley.

3. The all terrain vehicle of claim 2, wherein the air guide extends along approximately one-half of the circumference of the drive pulley.

4. The all terrain vehicle of claim 1, wherein the air guide is formed into a spiral from a first end of the air guide to a second end of the air guide relative to an axis of the drive pulley.

5. The all terrain vehicle of claim 4, wherein a distance between the air guide and the drive belt increases radially from the first end to the second end.

6. The all terrain vehicle of claim 1, wherein the support bracket further comprises a plurality of legs, a portion of each of the plurality of legs beyond the circumferential perimeter of the drive pulley extending inward toward the crankcase substantially parallel with the primary shaft.

7. The all terrain vehicle of claim 6, wherein the air guide is connected to at least two of the plurality of legs.

8. The all terrain vehicle of claim 6, wherein a rearward pair of the plurality of legs extend from the point of intersection at an obtuse angle from one another.

9. The all terrain vehicle of claim 6, wherein the rearward pair of legs extend in a direction that is substantially perpendicular to a force exerted on the primary shaft by the drive belt.

10. The all terrain vehicle of claim 6, wherein the plurality of legs further comprise a ribbed reinforcing portion, the ribbed reinforcing portion extending radially along the length of the plurality of legs.

11. The all terrain vehicle of claim 6, further comprising a generally circular reinforcing member extending along the circumference of the support bracket and interconnecting the legs, the reinforcing member having a diameter substantially the same size as a diameter of the drive pulley.

12. The all terrain vehicle of claim 11, wherein the reinforcing member further comprises a plurality of mounting portions configured to be connected to a transmission case.

13. The all terrain vehicle of claim 6, wherein the legs further comprise a plurality of flanges, the plurality of flanges comprising a plurality of positioning holes, wherein the plurality of flanges are connected to the crankcase.

14. The all terrain vehicle of claim 1, further comprising a transmission case, the transmission case comprising an inner and outer portion, the inner portion being configured to be connected to the crankcase and the outer portion being attached to the inner portion.

15. The all terrain vehicle of claim 14, wherein the transmission case is made of a resin-based material.

16. The all terrain vehicle of claim 1, wherein the air guide is integrally formed with the support bracket.

17. The all terrain vehicle of claim 1, wherein the air guide is disposed between the support bracket and the pulley.

18. The all terrain vehicle of claim 1, wherein the cross-sectional area of the air guide increases substantially continuously and substantially smoothly between a first end and a second end.

19. The all terrain vehicle of claim 18, wherein the cross-sectional area of the air guide increases over approximately one-half the circumference of the drive pulley.

20. The all terrain vehicle of claim 1, wherein the air guide is integrally formed with the support bracket, the air guide being disposed between the support bracket and the pulley, the cross-sectional area of the air guide increasing substantially continuously and substantially smoothly between a first end and a second end.

21. An all terrain vehicle comprising a frame, an engine compartment defined within the frame, an engine mounted within the engine compartment, the engine comprising a crankcase, a transversely extending crankshaft, a transmission connected to the crankshaft and disposed within a transmission chamber, the transmission comprising a drive pulley, a driven pulley and a drive belt connecting the drive pulley and the driven pulley, a transmission primary shaft connected to the drive pulley, a first end of the primary shaft supported by the crankshaft and a second end of the primary shaft supported by a support bracket, the support bracket connected to the crankcase, an air inlet adapted to permit entry of cooling air into the transmission chamber, the support bracket including a means for guiding a flow of cooling air along at least a portion of the drive belt.

22. The all terrain vehicle of claim 21, farther comprising a transmission cover at least partially defining the transmission chamber.

23. The all terrain vehicle of claim 21, wherein the means comprises an air guide for guiding a flow of cooling air along at least a portion of the drive belt.

24. The all terrain vehicle of claim 23, wherein the air guide extends along the outside circumference of the drive pulley.

25. The all terrain vehicle of claim 23, wherein the air guide forms a spiral along the outside circumference of the drive pulley from a beginning of the air guide to the end of the air guide.

26. The all terrain vehicle of claim 25, wherein the air guide spiral shape increases radially from the beginning to the end.

27. The all terrain vehicle of claim 21, wherein the means for guiding is included along an inner side of the support bracket.

28. The all terrain vehicle of claim 21, wherein the flow of cooling air is traveling in a general direction toward the drive belt upon leaving the means for guiding.

* * * * *

UNITED STATES PATENT AND TRADEMARK OFFICE
CERTIFICATE OF CORRECTION

PATENT NO. : 7,281,596 B2 Page 1 of 1
APPLICATION NO. : 10/701213
DATED : October 16, 2007
INVENTOR(S) : Kazutaka Fukuda It is certified that error appears in the above-identified patent and that said Letters Patent is hereby corrected as shown below:

At column 8, line 6, delete "c am" and insert -- cam --, therefor.

At column 14, line 43, in claim 22, delete "farther" and insert -- further --, therefor.

Signed and Sealed this

Eighth Day of July, 2008

JON W. DUDAS
*Director of the United States Patent and Trademark Office*